(12) United States Patent
Tanaka (10) Patent No.: US 6,519,360 B1
(45) Date of Patent: Feb. 11, 2003

(54) IMAGE PROCESSING APPARATUS FOR COMPARING IMAGES BASED ON COLOR FEATURE INFORMATION AND COMPUTER PROGRAM PRODUCT IN A MEMORY

(75) Inventor: Sumiyo Tanaka, Osaka (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/153,851

(22) Filed: Sep. 16, 1998

(30) Foreign Application Priority Data

Sep. 17, 1997 (JP) .............................................. 9-252287

(51) Int. Cl.⁷ ................................................ G06K 9/00
(52) U.S. Cl. ...................... 382/162; 382/164; 382/165; 345/597; 345/625; 707/1; 707/3
(58) Field of Search ................................ 382/118, 162, 382/163–181, 194, 298; 707/102, 1, 100, 3; 709/201; 345/418, 593, 597, 582, 426, 619, 625

(56) References Cited

U.S. PATENT DOCUMENTS

| | | | | |
|---|---|---|---|---|
| 4,739,405 A | * | 4/1988 | Sumida | 382/298 |
| 5,533,628 A | * | 7/1996 | Tao | 209/580 |
| 5,586,197 A | * | 12/1996 | Tsujimura et al. | 382/162 |
| 5,768,403 A | * | 6/1998 | Suzuki et al. | 382/165 |
| 5,799,105 A | * | 8/1998 | Tao | 382/167 |
| 5,893,095 A | * | 4/1999 | Jain et al. | 707/6 |
| 5,943,143 A | * | 8/1999 | Kawai et al. | 358/520 |
| 5,946,416 A | * | 8/1999 | Akagi | 382/194 |
| 6,021,221 A | * | 2/2000 | Takaha | 382/199 |
| 6,035,055 A | * | 3/2000 | Wang et al. | 382/118 |
| 6,040,825 A | * | 3/2000 | Yamamoto et al. | 345/173 |
| 6,047,085 A | * | 4/2000 | Sato et al. | 382/165 |
| 6,088,130 A | * | 7/2000 | Matsukubo | 438/710 |
| 6,088,137 A | * | 7/2000 | Tomizawa | 358/538 |
| 6,181,818 B1 | * | 1/2001 | Sato et al. | 382/170 |
| 6,188,786 B1 | * | 2/2001 | Ueda et al. | 382/165 |

FOREIGN PATENT DOCUMENTS

| | | |
|---|---|---|
| JP | 60-157681 | 8/1985 |
| JP | 5-28266 | 2/1993 |
| JP | 5-274372 | 10/1993 |
| JP | 6-274193 | 9/1994 |
| JP | 6-295318 | 10/1994 |
| JP | 7-271949 | 10/1995 |
| JP | 8-16789 | 1/1996 |
| JP | 8-329096 | 12/1996 |

OTHER PUBLICATIONS

Fundamentals of Image Recognition (II); Apr. 20, 1990.
Dr. Gupta, "Visual Information Retrieval Technology A Virage Perspective", Virage Image Engine API Specification, Feb. 1997.

* cited by examiner

Primary Examiner—John Breene
Assistant Examiner—Cheryl Lewis
(74) Attorney, Agent, or Firm—Burns, Doane, Swecker & Mathis, LLP (57) ABSTRACT

An image data processing apparatus for comparing images based on color feature information of images. The image data processing apparatus has a color group sorting table that stores information for sorting colors to a plurality of color groups. The image data processing apparatus counts color elements of each pixel of the image for every color group with reference to the color group sorting table. The image data processing apparatus obtains a representative color of each color group based on values of the color elements of pixels in every color group and an occupancy ratio of pixels counted for every color group to all pixels of the image, thereby extracts the color feature of the image. The image data processing apparatus compares images based on the color feature and searches desired images from an image database.

21 Claims, 12 Drawing Sheets

50 IMAGE DATABASE

| IMAGE DATA | KEYWORD | COLOR FEATURE | SEARCH KEY 1 | SEARCH KEY 2 | ...... |
|---|---|---|---|---|---|
| DATA A | KEYWORD 1 | COLOR FEATURE 1 | SHAPE 1 | PATTERN 1 | |
| DATA B | KEYWORD 2 | COLOR FEATURE 2 | SHAPE 2 | PATTERN 2 | |
| ⋮ | ⋮ | ⋮ | ⋮ | ⋮ | ⋮ |
| | | | | | |

COLOR GROUP SORTING TABLE

55

| GROUP No. | HUE(H) | LIGHTNESS (L) | SATURATION (S) | |
|---|---|---|---|---|
| 1 | 0~360 | 0.0~0.2 | 0.0~0.5 | ACHROMATIC COLOR GROUP |
| 2 | 0~360 | 0.2~0.85 | 0.0~0.1 | |
| 3 | 0~360 | 0.85~1.0 | 0.1~0.3 | |
| 4 | 320~ 25 | 0.0~1.0(*1) | 0.0~1.0(*2) | CHROMATIC COLOR GROUP |
| 5 | 25~ 70 | 0.0~1.0(*1) | 0.0~1.0(*2) | |
| 6 | 70~155 | 0.0~1.0(*1) | 0.0~1.0(*2) | |
| 7 | 155~200 | 0.0~1.0(*1) | 0.0~1.0(*2) | |
| 8 | 200~270 | 0.0~1.0(*1) | 0.0~1.0(*2) | |
| 9 | 270~320 | 0.0~1.0(*1) | 0.0~1.0(*2) | |

Fig.5B

LIGHTNESS GROUP IN CHROMATIC COLOR GROUP

| *1 |
|---|
| 0.00~0.45 |
| 0.45~0.75 |
| 0.75~1.00 |

Fig.5C

SATURATION GROUP IN CHROMATIC COLOR GROUP

| *2 |
|---|
| 0.00~0.45 |
| 0.45~0.75 |
| 0.75~1.00 |

| COMBINATION OF KEY IMAGE AND COMPARISON IMAGE | WEIGHT OF HUE $W_H$ | WEIGHT OF LIGHTNESS $W_L$ | WEIGHT OF SATURATION $W_S$ |
|---|---|---|---|
| BOTH ARE CHROMATIC | 1.0 | 0.1 | 0.2 |
| BOTH ARE ACHROMATIC | 0.4 | 0.9 | 1.0 |
| CHROMATIC AND ACHROMATIC | 0.4 | 0.3 | 1.0 |

IMAGE PROCESSING APPARATUS FOR COMPARING IMAGES BASED ON COLOR FEATURE INFORMATION AND COMPUTER PROGRAM PRODUCT IN A MEMORY

This application is based on patent application No. 9-252287 filed in Japan, the content of which is incorporated hereinto by reference.

FIELD OF THE INVENTION

The present invention relates to an image data processing apparatus for comparing image data having a plurality of pixels, and more particularly to an image data processing apparatus for comparing image data based on color feature information of the images. The present invention also relates to a computer program product for use in the image data processing apparatus.

DESCRIPTION OF THE PRIOR ART

Generally, image database stores and manages image data with attribute information such as creation dates, correction dates, file names, file formats etc. and search information such as keywords, shape features, colors, sound etc. added thereto.

In searching the image data in the image database, it is general to designate the search information such as the keyword etc. corresponding to the subject image. For this purpose, user need to add beforehand the search information indicative of image features to the image data. It is a burden to users. To lighten user's burden, it is effective to automatically extract features from the images and add extracted features to the images. The features to be extracted from each image are, e.g., a texture periodicity of the image, a basic pattern constituting the texture of the image or a feature related to a color representing the image (referred to as "a color feature" hereinafter).

These automatic extraction and addition of image feature make it possible to search a similar image for an image of a search key with the image as the search key based on features extracted from the image, so that the processing efficiency for the search and search accuracy are improved.

As a way of automatically extracting the color feature as one feature information from the image, for instance, Japanese Patent Laid-Open Publication No. 5-274372 discloses a method which detects the amount of each color constituent included in the image. The detected information is coded and added to image data. How to carry out the search with the use of this information and how to compare images are not described. According to another method disclosed by Japanese Patent Laid-Open Publication No. 8-16789, colors of the image are divided to several groups, a frequency of pixels included in each group is counted, a ratio of the frequencies is set as a feature, and images are compared with the use of the ratio. However, no specific means is depicted and only a conceptual description is made. Thus none of the above prior arts reveals a concrete means for extracting the color feature as a feature from the image, thereby comparing and searching images based on the color feature.

Since color images are supposed to be employed more and more in consequence of enhanced performance of information processing apparatuses and advancement in digitization of information, it becomes greatly important to handle the color feature of the image. Accordingly, an apparatus for processing image data, more specifically, extracting color features from the image and comparing images based on the color feature is earnestly demanded.

SUMMARY OF THE INVENTION

The object of the present invention is therefore to provide an image data processing apparatus for extracting a feature information from images and comparing images based on the color feature information.

The another object of the present invention is to provide a computer product in a memory to achieve image data processing for extracting a feature information from images and comparing images based on the feature information.

In order to achieve the aforementioned objective, an image data processing apparatus for processing data of images each having a plurality of pixels is provided in a first aspect of the present invention, which comprises an extraction controller whereby colors constituting the image data are sorted to a plurality of color groups based on predetermined color elements, a count of pixels belonging to each color group is counted, so that feature information of images is extracted, and a comparison controller whereby a plurality of images are compared based on the feature information extracted by the extraction controller.

In an image data processing apparatus provided according to a second aspect of the present invention, the apparatus includes an input controller through which image data of a plurality of images are input, an extraction controller which classifies colors constituting the image data to a plurality of color groups based on predetermined color elements, counts pixels belonging to each color group for every image input through the input controller, thereby extracting feature information of each image, an image database for storing image data input through the input controller such that the image data are linked to the feature information extracted by the extraction controller, a designating device for designating a search key image as a search key, and a search controller which compares the feature information of the search key image designated by the designating device with the feature information of each image stored in the image database, and searches for image data having feature information similar to that of the search key image.

According to a third aspect of the present invention, a computer program product in a memory is provided to process data of images each consisting of a plurality of pixels. The computer program product includes an extraction control whereby colors are divided to a plurality of color groups based on predetermined color elements, pixels belonging to each color group are counted, so that feature information of images is extracted, and a comparison control whereby a plurality of images are compared based on the feature information extracted by the extraction controller.

The computer program product further includes a registration control whereby the feature information extracted by the extraction control and the image data are registered in the image database such that they are linked, and a search control whereby image data are searched from the image database with the use of the comparison control.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals.

DETAILED DESCRIPTION OF THE INVENTION

An image data processing apparatus according to a preferred embodiment of the present invention will be described with reference to the accompanying drawings.

<Concept of Image Data Processing Apparatus>

The image data processing apparatus according to the invention extracts a color feature from images and compares images based on the extracted color feature of images to determine whether the images are similar to each other.

Figure 1:
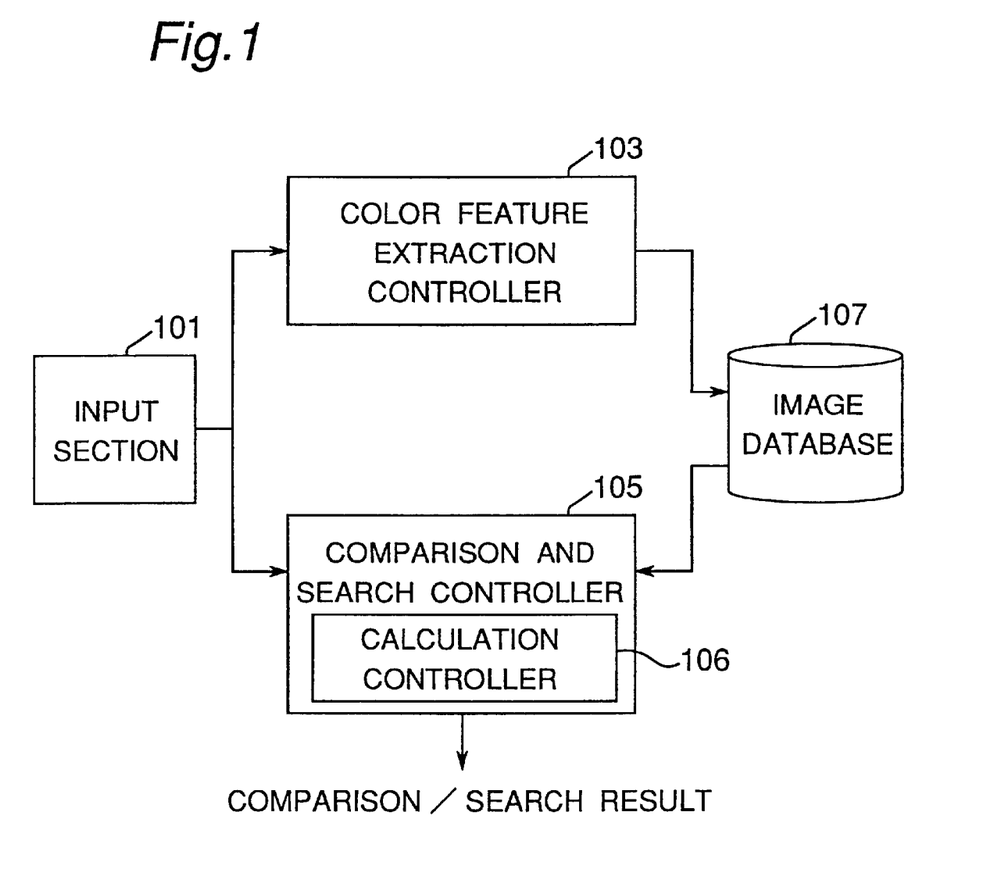
FIG. 1 is a block diagram showing a concept of an image data processing apparatus according to the present invention.

FIG. 1 is a block diagram showing a concept of an image data processing apparatus according to the present invention. The image data processing apparatus comprises an input section 101, a color feature extraction controller 103, a comparison and search controller 105 and an image database 107.

The image database 107 stores image data and feature information related with the image data. The input section 101 inputs an image data from which a color feature information is extracted. The input section 101 also designates an image data which is used as a search key according to user's operation.

The color feature extraction controller 103 extracts color feature information from the image inputted by the input section 101 and registers the extracted color feature with the image data to the image database 107.

Specifically, the color feature extraction controller 103 extracts the color feature information by sorting colors constituting the image into a plurality of color groups based on color elements and counting a number of pixels belonging to each color group. The color feature information may comprise a representative color of the color group and the number of pixels in each color group. The color elements may comprise a hue, a saturation and a lightness.

The comparison and search controller 105 compares images based on the color feature information of the images. That is, the comparison and search controller 105 searches a image similar to the search key from the image database 107 by comparing the image designated as the search key with images stored in the image database 107 based on the color features. The comparison and search controller 105 includes a calculation controller 106 for calculating a degree of similarity between images based on color feature information. The degree of similarity is used for comparing images.

An embodiment of the image data processing apparatus with the above concept will be described bellow.

<General Constitution of Image Data Processing Apparatus>

Figure 2A:
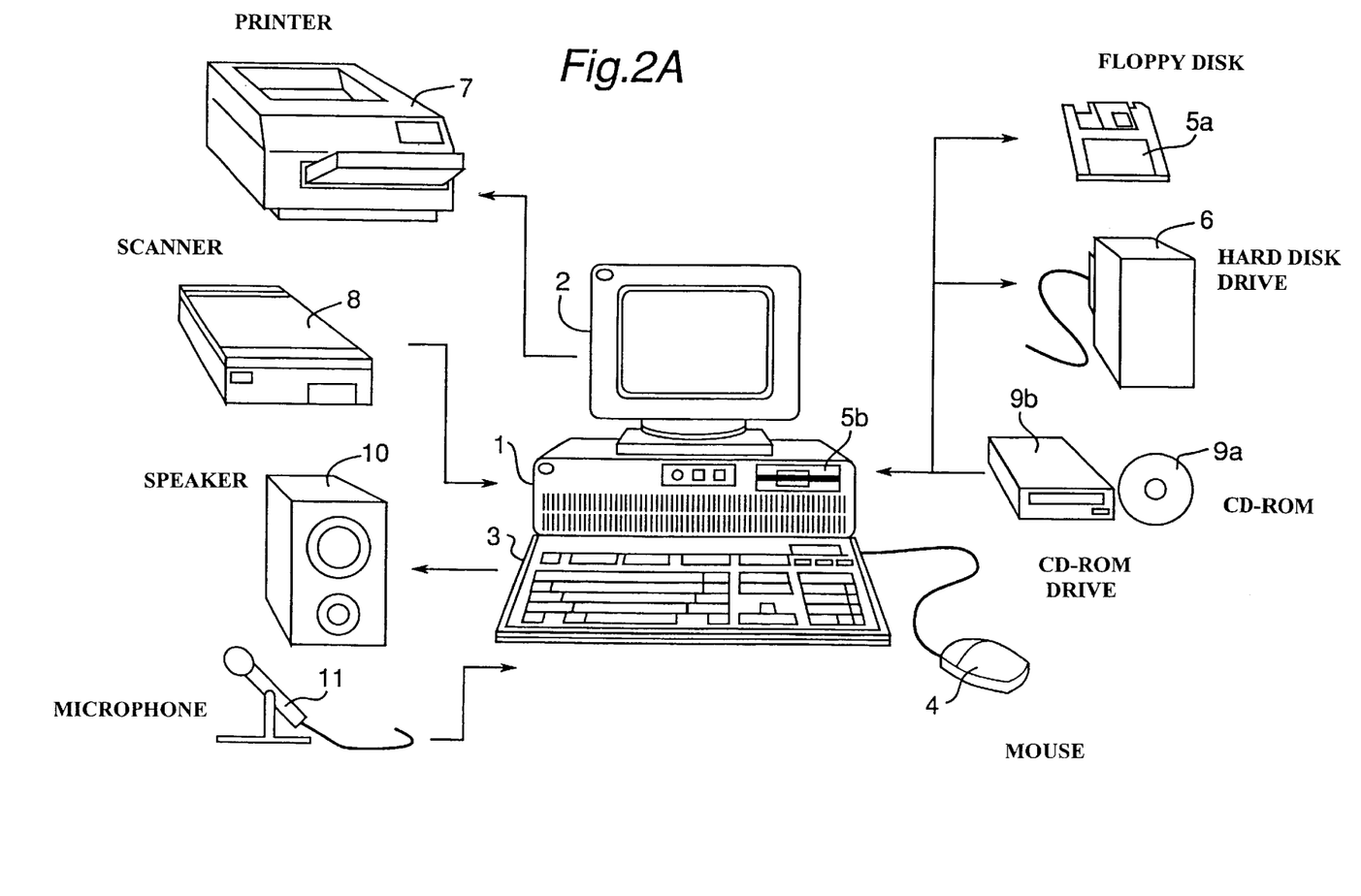
FIG. 2A is a diagram schematically showing an image data processing apparatus according to a preferred embodiment of the present invention.

FIG. 2A shows the schematic configuration of an image data processing apparatus (referred to as a "system" hereinafter) according to the embodiment. As is clear from FIG. 2A, the system is primarily comprised of a control apparatus 2A which includes a central processing unit (described as a "CPU" below) and controls the whole system. The CPU is, e.g., a pentium of Intel, Inc. The control apparatus 1 is connected with a display device 2 making displays of images or characters, etc. and displays for the manipulation, a keyboard 3 and a mouse 4 provided for various inputs and instructions, a floppy disk drive 5b and a hard disk drive 6 as data storage media, a printer 7 for printing characters, image data, etc., a scanner 8 used for taking image data, a CD-ROM drive 9b reading data stored in a CD-ROM 9a, a speaker 10 and a microphone 11 respectively for outputting and inputting sound therethrough.

Figure 2B:
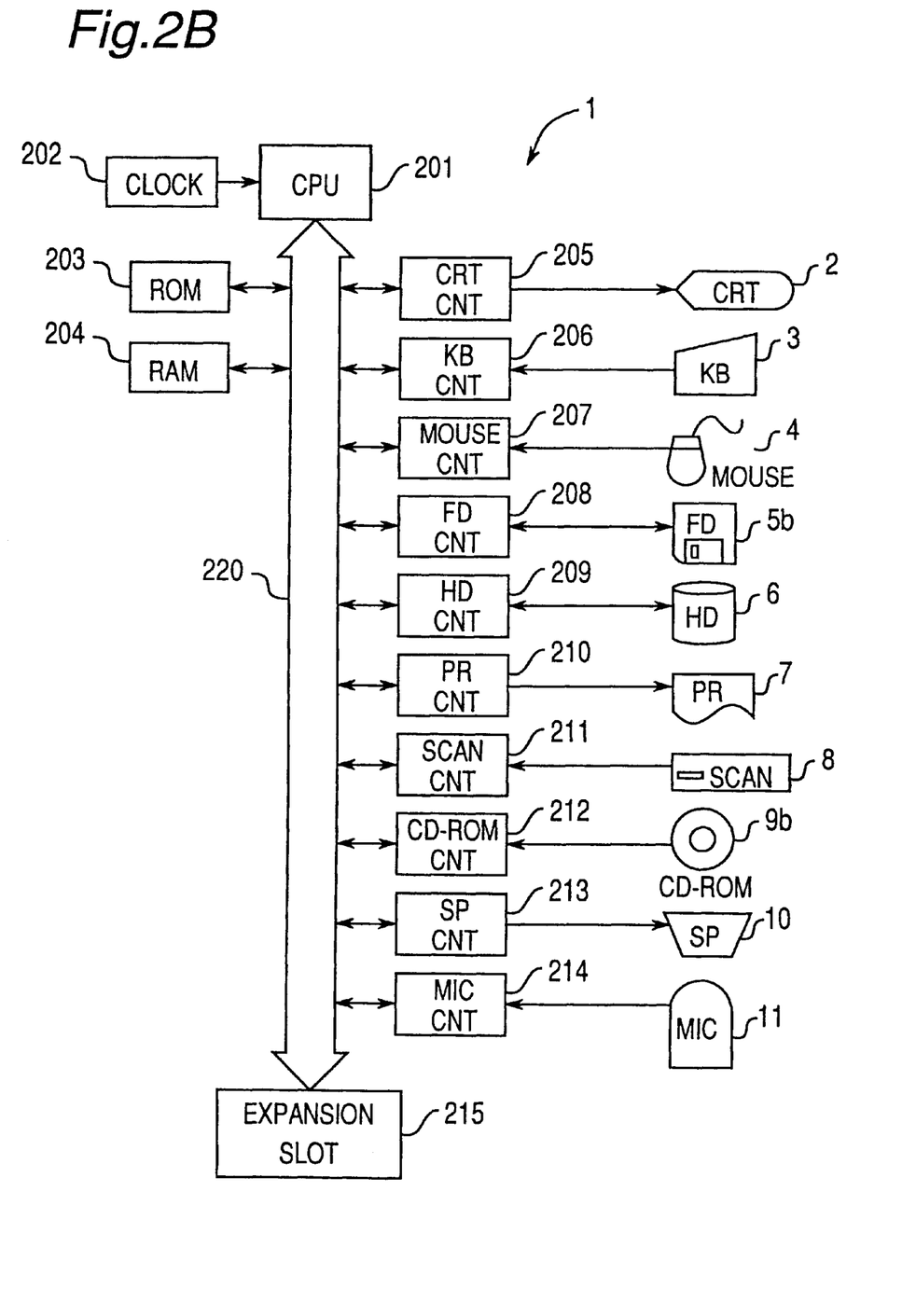
FIG. 2B is a block diagram showing an image data processing apparatus.

FIG. 2B is a block diagram of the system. A ROM 203 storing a program controlling the system and a RAM 204 temporarily storing data and a program to be executed by the CPU 201 for the control are connected to the CPU 201 via a data bus 220. Moreover, circuits 205–214 are connected to the CPU 201 via the data bus 220. Specifically, the display control circuit 205 controls the display device 2 to display images, characters, etc. The keyboard control circuit 206 controls the transfer of inputs from the keyboard 3. The mouse control circuit 207 controls the transfer of inputs from the mouse 4. The floppy disk drive control circuit 208 and hard disk drive control circuit 209 control the floppy disk drive 5b and hard disk drive 6 respectively. The printer control circuit 210 controls outputs to the printer 7. Likewise, the scanner control circuit 211, the CD-ROM drive control circuit 212, the speaker control circuit 213 and the microphone control circuit 214 control the scanner 8, CD-ROM drive 9b, speaker 10 and microphone 11 respectively. A clock 202 is further connected to the CPU 201 so as to generate a reference clock necessary for driving the system. An expansion slot 215 for connecting various expansion boards is also connected to the CPU 201 via the data bus 220. An SCSII board can be connected to the expansion slot 215, through which the floppy disk drive 5b, hard disk drive 6, scanner 8, CD-ROM drive 9b or the like may be connected to the CPU 201.

Although a floppy disk 5a is used as an image data storage medium in the system, other information storage media such as a magneto-optic (MO) disk and the like may be employed. In addition, the scanner 8 used as an image data input device may be replaced with the other data input device such as a still video camera, a digital camera or the like. The printer 7 as an output device may be a different type such as a digital copier, etc. Although the program for the control of the system is stored in the ROM 203, a part or the whole of the program may be stored in an information storage medium such as the floppy disk 5a, hard disk drive 6, CD-ROM 9b, DVD-ROM or the like, so that the program and data are read out to the RAM 204 from the information storage medium upon necessities.

<Database and Color Group Sorting Table>

For holding and managing image data, the system has an image database which includes data and additional information as a key to search for the data, etc. The data is linked to the additional information in the database. The system also includes a color group sorting table to be referred to when color features are to be extracted from images. The image database and the color group sorting table are logically configured on the information storage medium such as the hard disk drive 6 or the like.

Figure 3:
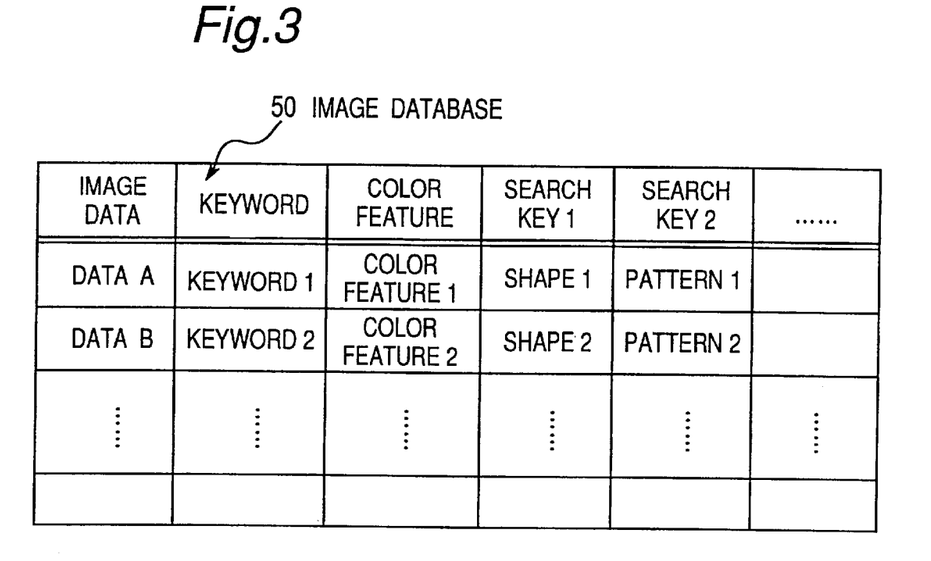
FIG. 3 is a diagram showing an image database.

The structure of the image database of the system is exemplified in FIG. 3. An image database 50 in FIG. 3 consists of an "image data" as image information to be managed, a "key word" which is one of search keys to the image data, a color feature representing features related to colors of the image data, and search keys, namely, search information, etc.

Figure 4:
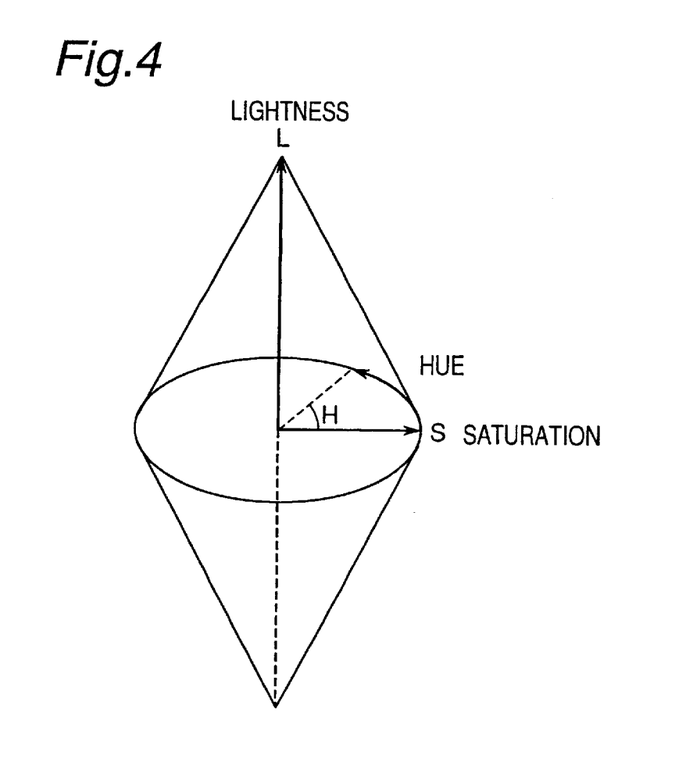
FIG. 4 is a diagram showing an HSL color space.

The color group sorting table based on an HSL color space shown in FIG. 4 will be described first. In HSL color space, a color is specified by three elements, i.e., a hue (H), a saturation (S) and a lightness (L). In FIG. 4, the hue is expressed by an angle on a horizontal plane, the saturation is expressed by a distance in a direction of a radius vector from a center axis (axis extending in an up-down direction) and the lightness is expressed by coordinates on the center axis in the HSL color space. To express colors by the hue, saturation and lightness allows human being to perceive colors more easily.

In the embodiment, the HSL color space is divided to nine areas, in other words, colors are sorted to nine color groups. The color group sorting table stores classification information of the color groups.

Figure 5A:
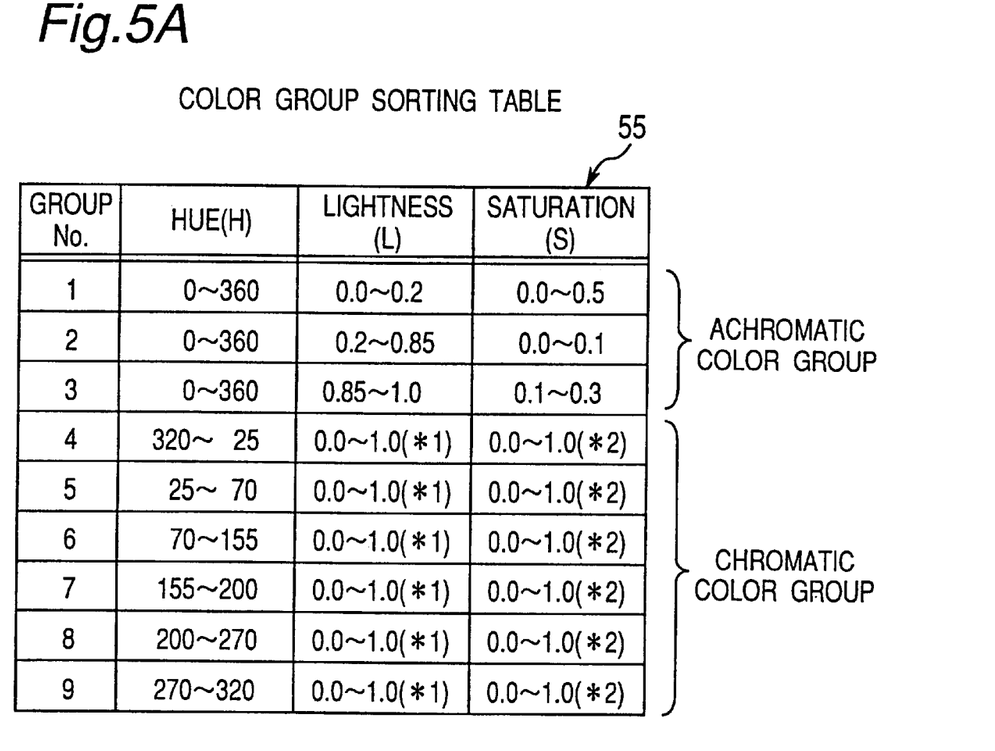
FIG. 5A is a diagram showing an example of a color group sorting table.
Figure 5B:
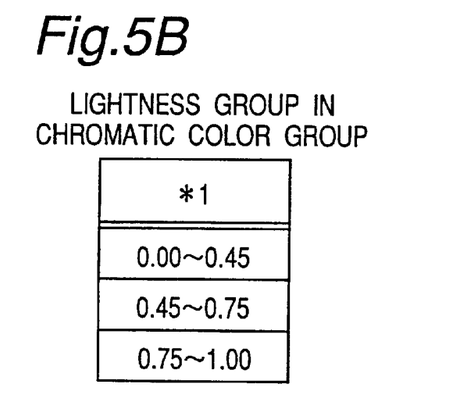
FIG. 5B is a diagram showing an example of a lightness group value in chromatic color group.
Figure 5C:
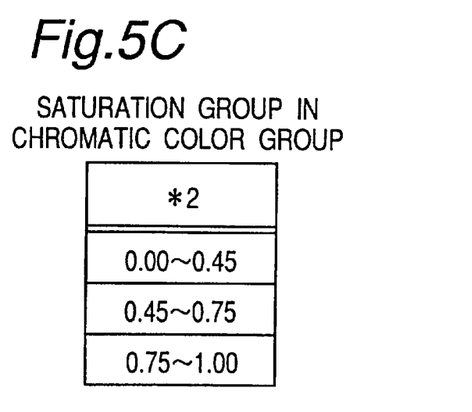
FIG. 5C is a diagram showing an example of a saturation group value in chromatic color group.

FIG. 5 shows the classification information stored in the color group sorting table 55, i.e., each range of the hue, saturation and lightness in each color group. The system determines which color groups a color constituting the image belongs to, based on the color group sorting table 55. In FIG. 5A, group Nos. 1–3 are achromatic color groups, while group Nos. 4–9 are chromatic color groups. The lightness and saturation of the chromatic color groups are further finely classified as in FIGS. 5B and 5C. Specifically, chromatic colors are divided to a first group of a 0.00–0.45 range of the lightness and saturation, a second group of a 0.45–0.75 and a third group of a 0.75–1.00.

Although colors are classified based on the hue, saturation and lightness in the HSL color space according to the embodiment, the present invention is not restricted to the embodiment and the colors may be divided based on the other elements specifying colors.

<Control Operation of Image Data Processing Apparatus>

A control operation of the system will be specifically described with reference to a flow chart.

<Main Flow>

Figure 6:
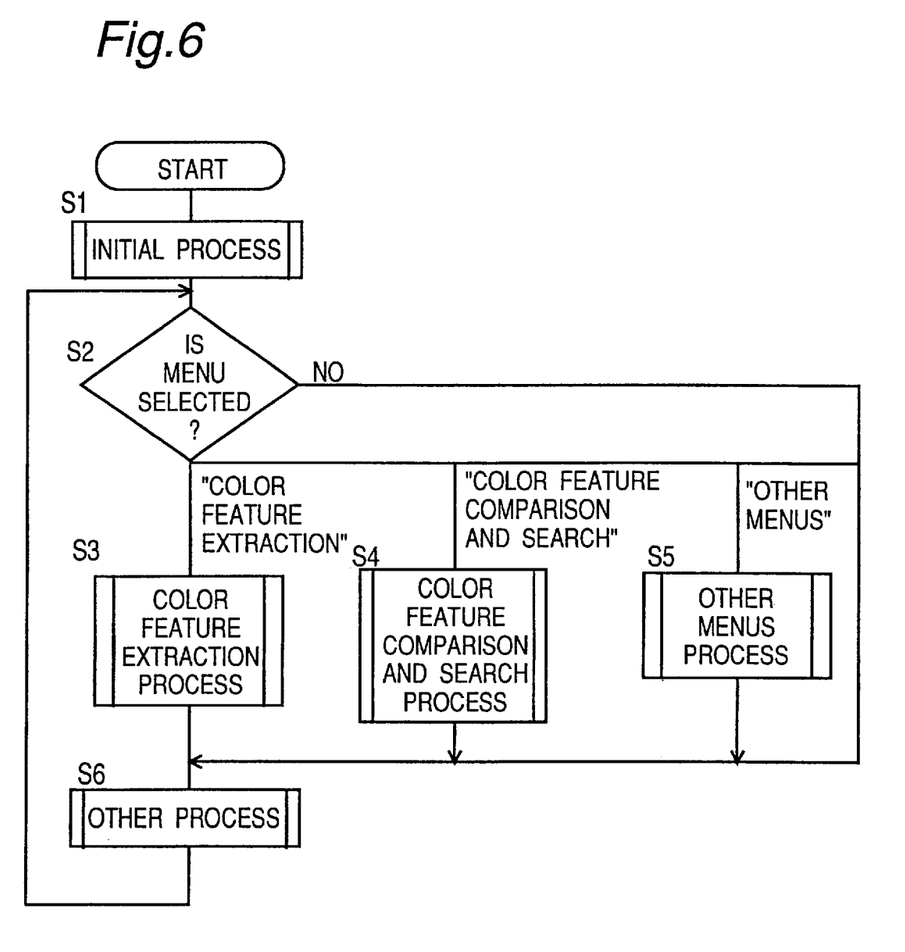
FIG. 6 is a flow chart of a main flow of the image data processing apparatus.

FIG. 6 is a flow chart of a main routine of the program executed by the CPU 201 in the system. When the program starts, an initial process is carried out, for instance, flags required in each process are initialized, an initial menu screen is displayed, etc. (S1).

Figure 7:
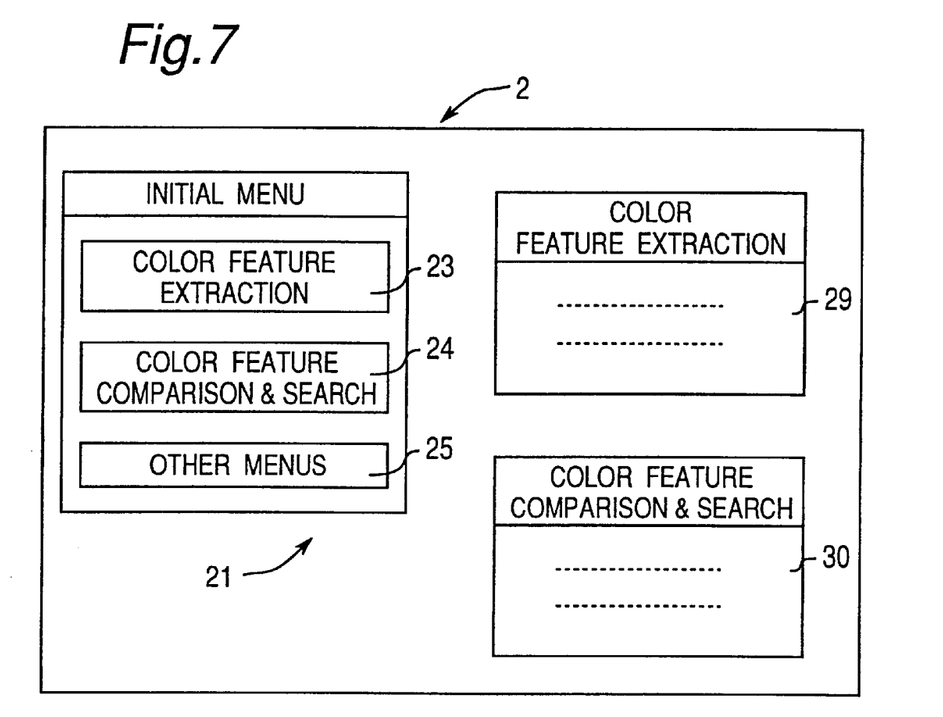
FIG. 7 is a diagram showing an example of a display on a screen for data-input or data-setting etc.

An example of the initial menu screen is illustrated in FIG. 7. Selection items 23–25 for the selection of predetermined processes are displayed in the form of icons on an initial menu screen 21. A predetermined process is performed when the user selects one of the items 23–25. The user selects various processes, inputs set values etc. via the keyboard 3 and mouse 4 on the set screen such as the initial menu screen 21 displayed on the display device 2 or the like.

After step S1, it is detected whether or not the user selects any menu on the initial menu screen 21 (S2). If a "COLOR FEATURE EXTRACTION" 23 is selected in step S2, a color feature extraction process is started (S3) whereby a color feature is extracted from designated image data and registered along with the image data into the image database 50. Step S6 follows step S3. In the event a "COLOR FEATURE COMPARISON AND SEARCH" 24 is selected in step S2, the flow moves to a color feature comparison and search process (S4). In step S4, color features of the designated image data and the image data registered in the database 50 are compared, and the image data with a similar color feature are searched for. Step S4 is followed by step S6. When an "OTHER MENUS" 25 is selected in step S2, the other menus process is carried out (S5) and step S6 is started thereafter. Without any menu selected in step S2, nothing is conducted and the flow goes to step S6. After all the other processes are completed in step S6, the flow returns to step S2 and the same procedures are repeated.

Since the other menus process (S5) is fundamentally equal to that of a general search system and not directly related to the present invention, the description will be omitted here. The color feature extraction process (S3) and color feature comparison and search process (S4) will be detailed below.

<Color Feature Extraction Process>

Figure 8:
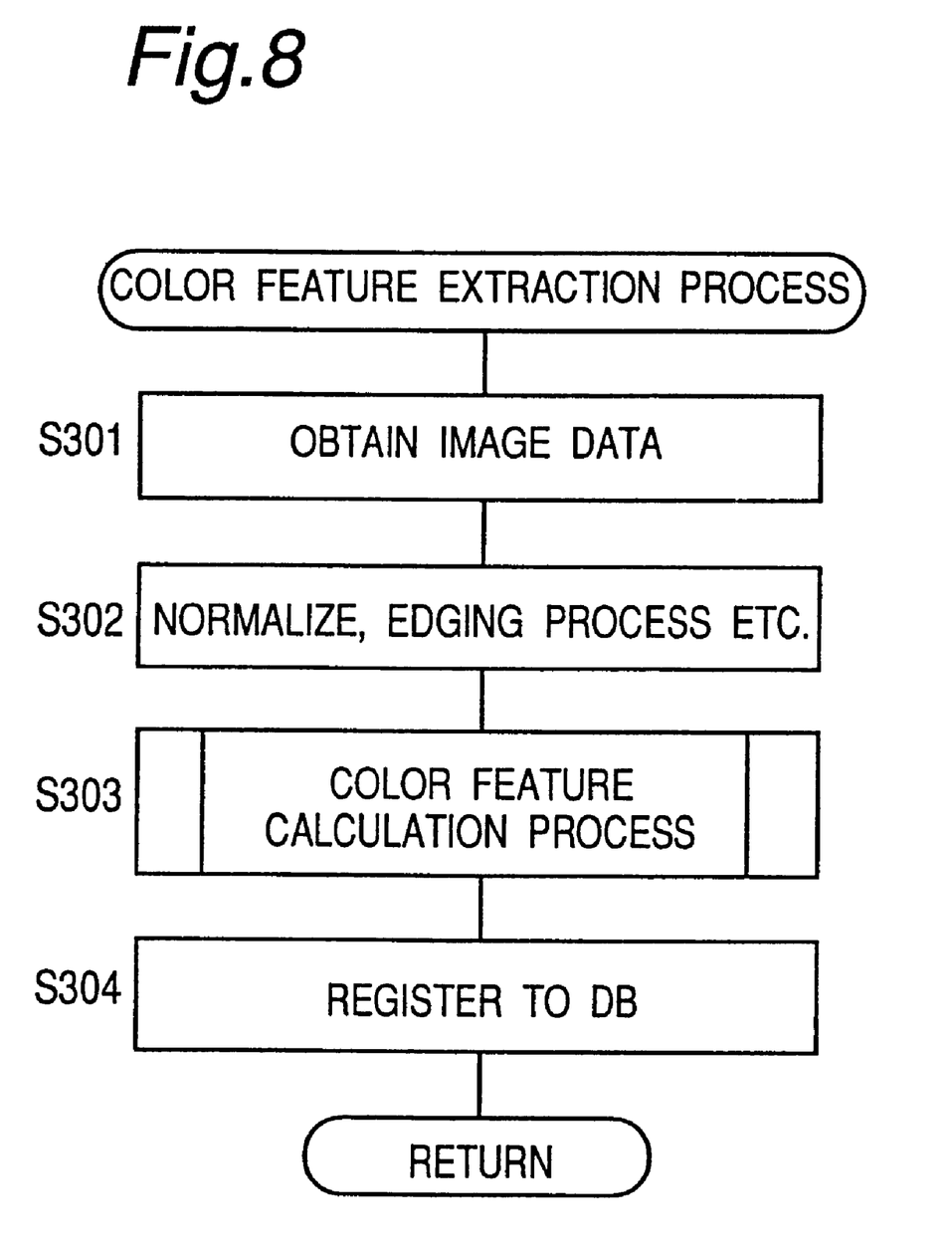
FIG. 8 is a flow chart of a color feature extraction process in the image data processing apparatus.

First, the color feature extraction process (step S3) will be discussed with reference to a flow chart of FIG. 8.

The image data designated by the user on a screen 29 via the keyboard 3 or the like is obtained by the system (S301). The image data may be images registered in the image database 50, images retained on the storage medium such as the floppy disk 5a or the like, or be read via the scanner 8 or the like.

Then, in order to speed up succeeding procedures, the obtained image data are processed to a predetermined size and a predetermined shape in a normalization process, edges are obtained from the image data in an edge process etc. (S302).

The color feature is calculated from the image with reference to the color group sorting table 55 in a color feature calculation process (S303). The color feature calculation process for the color feature will be described more in detail later.

Finally, the calculated color feature of the image is related to the image data and registered in the database 50 (S304), when the color feature extraction process is completed.

<Color Feature Calculation Process in Step S303>

Figure 9:
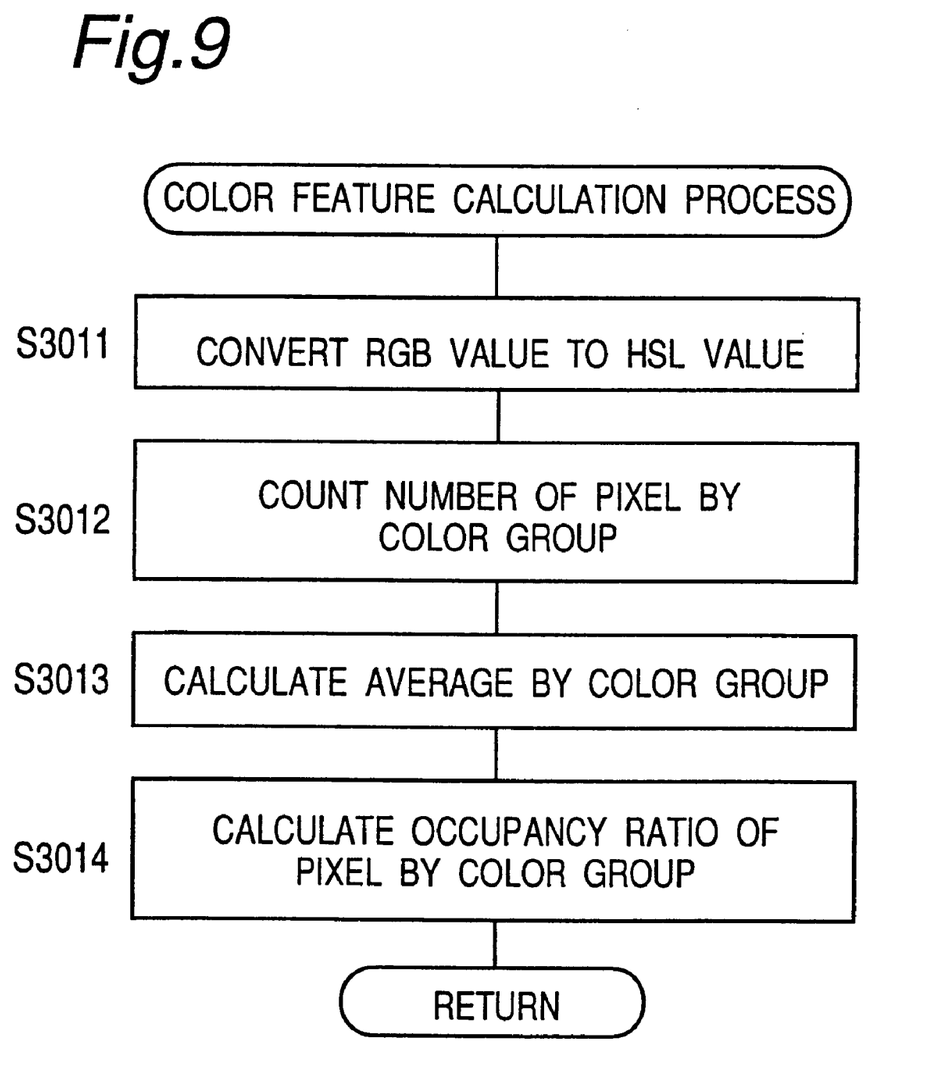
FIG. 9 is a flow chart of a color feature calculation process.

The color feature calculation process in step S303 will now be depicted with reference to a flow chart of FIG. 9.

A pixel value indicated by an RGB value is converted to an HSL value for every pixel constituting the image (S3011). Then, which of the color groups a color of each pixel of the image belongs to is detected and, a number of pixels belonging to each color group is counted for every color group (S3012).

Concretely, a color group to which the color of each pixel belongs is detected based on the hue (H), lightness (L) and saturation (S) of the pixel with reference to the color group sorting table 55. At this time, whether the pixel is achromatic or not is detected from a value of the saturation. If the pixel is achromatic, the color group is determined based on the lightness and saturation regardless of the hue. If the pixel is not achromatic (i.e. chromatic), the color group is determined only from the hue.

An average value of each of the hue, lightness and saturation of each color group is calculated based on the obtained count of pixels (S3013). A color determined by the average values of the hue, lightness and saturation is taken as an average color of the group. The average value $H_a$ of the hue, the average value $S_a$ of the saturation and the average value $L_a$ of the lightness are obtained according to equations below wherein n is the count of pixels belonging to the color group, $h_i$, $l_i$, $s_i$ (i=1, 2, . . . n) are the hue, lightness and saturation of each pixel belonging to the color group, and N is a total count of pixels of the image.

$$H_a=(h_1+h_2+ \ldots +h_n)/N \quad (1)$$

$$S_a=(s_1+s_2+ \ldots +s_n)/N \quad (2)$$

$$L_a=(l_1+l_2+ \ldots +l_n)/N \quad (3)$$

The average values of the lightness and saturation when the pixels are chromatic are calculated based on the first to third lightness groups and saturation groups more finely divided in the color group. In other words, when the pixels are chromatic, the lightness and saturation are further divided to the first to third groups, an average value of each of the lightness and saturation for a group having a maximum count of pixels among the first to third groups is calculated. This calculated value is determined as the average value of each of the lightness and saturation of the color group.

After the average values of the hue, lightness and saturation are obtained for each color group, a ratio R (referred to as an "occupancy ratio" hereinbelow) of the color belonging to the color group to the whole image is calculated (S3014) according to an equation (4), where n is the count of pixels belonging to the subject color group and N is the count of pixels of the whole image.

$$R=n/N \quad (4)$$

In the above-described manner, the average values of the hue, lightness and saturation (average color) and the occupancy ratio of each color group are calculated as the color feature of the image.

Supposing that 10 pixels of an image belong to the color group 9 as follows, how to calculate the average values of the hue, lightness and saturation and the occupancy ratio of the color group 9 will be described.

(H, S, L)=(275, 0.80, 0.90) (274, 0.90, 0.95) (280, 0.87, 0.74) (281, 0.44, 0.43) (275, 0.55, 0.73) (273, 0.51, 0.72) (279, 0.50, 0.73) (280, 0.80, 0.74) (274, 0.85, 0.71) (280, 0.43, 0.33)

Since the pixels belonging to the color group 9 are chromatic, it is necessary to obtain average values of the lightness and saturation in the more finely divided groups. In this example, there are two pixels included in the first group of the lightness (in the 0.00–0.45 range), three pixels included in the second group (in the 0.45–0.75 range) and five pixels included in the third group (in the 0.75–1.00 range). In terms of the saturation, two pixels are included in the first group, six pixels in the second group and two pixels in the third group.

From the above, the third group of the lightness including a maximum count of pixels and the second group of the saturation including a maximum count of pixels are selected to calculate respective average values. As a result, the average value of the lightness of.the color group with the group number 9 is calculated based on a lightness value of pixels included in the third group. The average value of the saturation of the color group with the group number 9 is calculated based on a saturation value of pixels included in the second group. Concretely, Average value $H_a$ of the hue=(275+274+280+281+275+273+279+280+274+280)/10=277

Average value $S_a$ of the saturation=(0.74+0.73+0.72+0.73+0.74+0.71)/6=0.728

Average value $L_a$ of the lightness=(0.80+0.90+0.87+0.80+0.85)/5=0.844

Occupancy ratio R=10/100=0.10

A color expressed by the thus-obtained average values is denoted as a "featuring color" of the color group. The color feature of the image is accordingly characterized by a plurality of featuring colors and occupancy ratios as ratios that the featuring colors occupy the whole image.

<Color Feature Comparison and Search Process>

Figure 10:
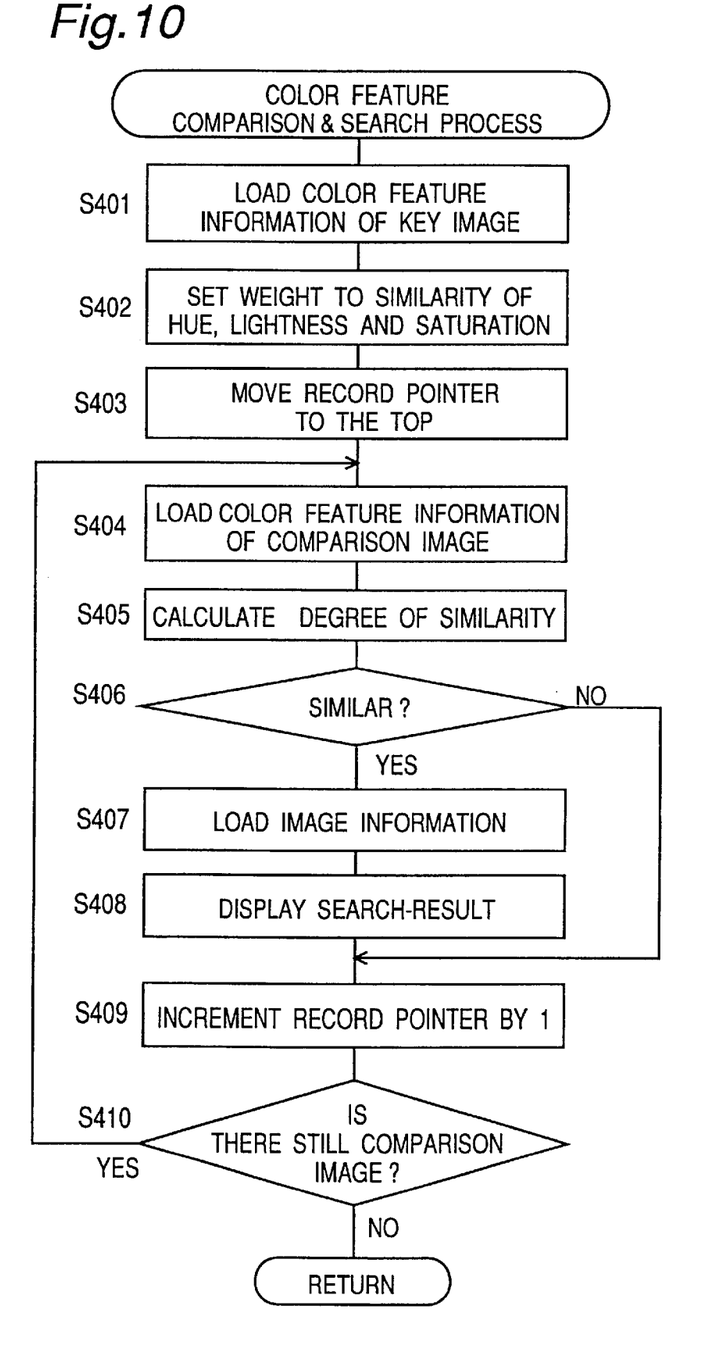
FIG. 10 is a flow chart of a color feature comparison and search process of in the image data processing apparatus.

The color feature comparison and search process (S4) will be described with reference to a flow chart of FIG. 10 in particular relation to a case where the search is carried out by the user. When the user designates an image as the search key (referred to as a "key image" hereinafter) through the keyboard 3 or the like on a screen 30, the key image is compared with images stored in the image database 50 based on color features, so that an image of a similar color feature is searched and displayed as a result of the search at a display means such as the display device 2 or the like.

More specifically, the color feature of the key image is loaded from the database 50 (S401). A weight to be used when a degree of similarity of images is calculated is set (S402). While the weight will be explained more in detail later, the weight may be set by the user or may be preliminarily set in the system.

A record pointer is moved to a top of the image database 50 which stores image data to be compared and searched (S403). The color feature of an comparison image (an image to be compared) which is indicated by the record pointer is loaded from the database 50 (S404). The degree of similarity between the key image and the comparison image is calculated based on the color features of the key image and the comparison image (S405), which will be detailed afterwards. It is detected based on the calculated degree of similarity, that is, by comparing the degree of similarity with a predetermined threshold value whether or not the comparison image is similar to the key image (S406). Unless the images are detected to be similar in step S406, the flow moves to step S409. On the other hand, if the images are similar to each other, the flow goes to step S407.

In step S407, the image information of the image pointed by the record pointer is loaded from the image database 50. The image information includes image data and attribute information such as a file name of the image data, a path name indicating a location of the image data stored, etc. The loaded image information is displayed as the search result to the display means such as the display device 2 or the like (S408), and the flow moves to step S409.

The display of the search result is made in various ways, for example, to display a thumbnail image with a name of the image, a file name or path of an original image from which the thumbnail image is generated, or an address where the original image is obtained. Although the result is displayed every time the similar image is searched in this embodiment, each search result may be stored in the storage medium such as the hard disk drive 6, RAM 204 etc. and displayed altogether when the search is finished. In that case, a count of images judged to have similarity may be counted and displayed, or the images may be displayed, for example, in the order of higher similarity.

The record pointer is incremented by one in step S409. Then, it is detected whether or not image data designated by the record pointer, to be compared next with the key image are present in the image database 50. If new data to be searched are not present in the image database 50, the process is completed. If the image data to be compared are present, the flow returns to step S404. The above procedures are repeatedly carried out until no image data to be compared remain in the image database 50. As described hereinabove, the system enables images similar to the key image to be searched for based on color features of images.

In the present system, the user can designate a degree of search accuracy, namely "ambiguity", along with the key image. At this time, a threshold value for judging the similarity is changed in accordance with the ambiguity in step S406. By way of example, when the ambiguity is high, the threshold value for the judgement of similarity is set low, whereby the image of even low similarity is judged to be similar. The search accuracy can thus be freely changed by setting the ambiguity or changing a criterion for the similarity in accordance with the ambiguity.

In the above-described process, the color features of the key image and comparison image are registered beforehand in the image database 50 and the images are compared and searched with the use of the registered color feature data. However, it is not always necessary to preliminarily register the color features of images in the image database 50. It is possible to extract color features from images in a manner as indicated in steps S301–S303 and compare the images with the use of the extracted color features at every comparison and search process.

<Calculation for Degree of Similarity in Step S405>

Figure 11:
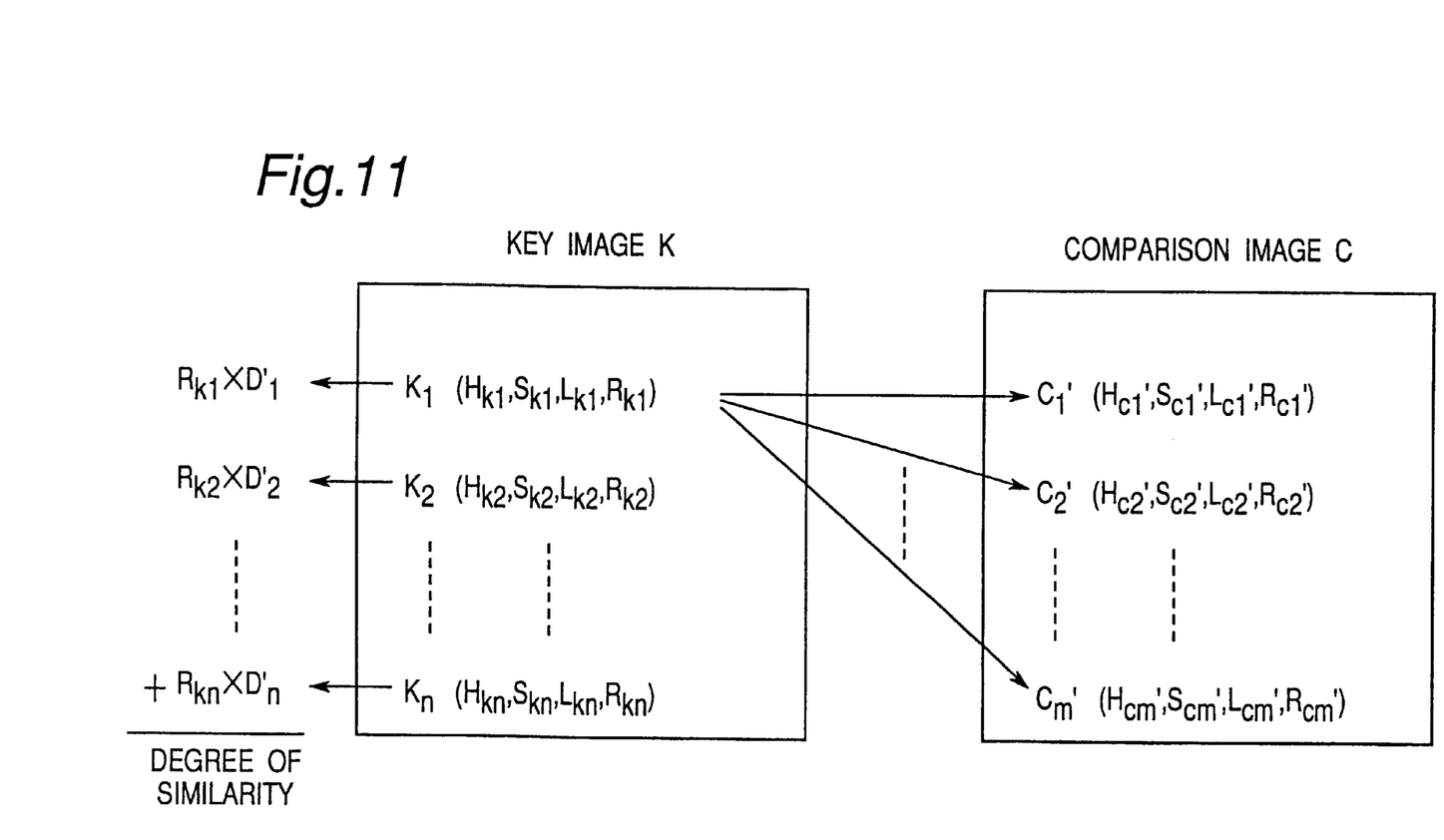
FIG. 11 is a diagram showing a state where a key image and a comparison image are compared based on the color feature.

The calculation for a degree of similarity in step S405 will be detailed with reference to FIG. 11. The key image in FIG. 11 has color features $K_1, K_2, \ldots K_n$. Each color feature $K_i$ (i=1, 2, \ldots n) of the key image is characterized by a hue $H_{ki}$, a saturation $S_{ki}$ and a lightness $L_{ki}$ which determine an average color of the color group and an occupancy ratio $R_{ki}$ as a ratio of the average color occupying the image. A comparison image C has color features $C_1, C_2, \ldots C_m$ and each color feature $C_j$ (j=1, 2, \ldots m) is characterized by a hue $H_{cj}$, a saturation $S_{cj}$ and a lightness $L_{cj}$ representing an average color of the color group and an occupancy ratio $R_{cj}$ as a ratio of the average color occupying the comparison image.

A degree of similarity is calculated based on the color features of the key image K and comparison image C. That is, one color feature $K_i$ of the key image K is compared with all color features $C_j$ (j=1, 2, \ldots m) of the comparison image C. Degrees of similarity $H_i$, $S_i$ and $L_i$ of the hue, saturation and lightness are calculated in each combination of the color features.

A calculation method for the degrees of similarity $H_i$, $S_i$ and $L_i$ will be explained in detail.

According to the method, the calculation is conducted so that the degree of similarity of the hue $H_i$ is increased when the color is bright and the degree of similarity of the hue is high, i.e., when the lightness of the images are not smaller than a predetermined value and a lightness difference is smaller than a predetermined value, and decreased when the color is bright and the degree of similarity of the hue is negative. The degree of similarity of the saturation $S_i$ is calculated simply by a difference of saturation. The degree of similarity of the lightness $L_i$ is calculated by a difference of lightness if both of the compared colors of images are dark. If either of the compared colors of the images is bright, namely, either of the lightness of the compared colors is not smaller than a predetermined value, and a lightness difference is large, then the degree of similarity of the lightness is calculated to be a negative value.

For example, the degrees of similarity is obtained as follows.

(1) Degree of similarity of hue ($H_i$)

i) when $K_i$ and $C_j$ are in the same color group, $$H_i=1.0 \tag{5a}$$

ii) when $K_i$ and $C_j$ are in different color groups,
   a) when only $K_i$ or $C_j$ is achromatic, and
      $L_{max}>0.5$ (at least either of $K_i$ and $C_j$ is a bright color), $$H_i=-0.5 \tag{5b}$$

$L_{max}<=0.5$ (both of $K_i$ and $C_j$ are dark colors), $$H_i=-0.25 \tag{5c}$$

b) when both of $K_i$ and $C_j$ are achromatic, and
      $L_{max}>0.5$, $$H_i=-0.25 \tag{5d}$$

$L_{max}<=0.5,$ $$H_i=0.0 \tag{5e}$$

c) when both of $K_i$ and $C_j$ are chromatic, $$H_o=\text{hue difference}/180\times(2.6666\times\text{hue difference}/180-4.6666)+1.0 \tag{5f}$$

After $H_o$ is calculated by the above equation (5f), $H_i$ is determined based on values of a higher lightness $L_{max}$ and $H_o$, as follows;

$L_{max}<=0.5,$ $$H_i=H_o \tag{5g}$$

$L_{max}>0.5$, and $$\text{if } H_o>0.0, H_i=H_o-0.75 \tag{5h}$$

$$\text{if } H_o<=0.0, H_i=H_o-1.25 \tag{5i}$$

(2) Degree of similarity of saturation ($S_i$)

$$S_i=1.0-2.0\times(S_{max}-S_{min}) \tag{6}$$

wherein $S_{max}$ is a larger one of $S_{ki}$ and $S_{cj}$, and $S_{min}$ is a smaller one of them.

(3) Degree of similarity of lightness ($L_i$)
   $L_{max}>0.55$ (at least one of $K_i$ and $C_j$ is a bright color), $$L_i=1.0-(L_{max}-L_{min}) \tag{7a}$$

$L_{max}<=0.55$ (both of $K_i$ and $C_j$ are dark colors), $$L_i=1.0-(L_{max}-L_{min}) \tag{7b}$$

wherein $L_{max}$ is a larger value of $L_{ki}$ and $L_{cj}$, and $L_{min}$ is a smaller one of them.

After the degrees of similarity of the hue, saturation and lightness are calculated as above, a degree of similarity $D_i$ for the color feature $K_i$ is calculated with weights $W_H W_S$ and $W_L$ of the corresponding degrees of similarity taken into consideration.

$$D_i=H_i\times W_H+S_i\times W_S+L_i\times W_L \tag{8}$$

Figure 12:
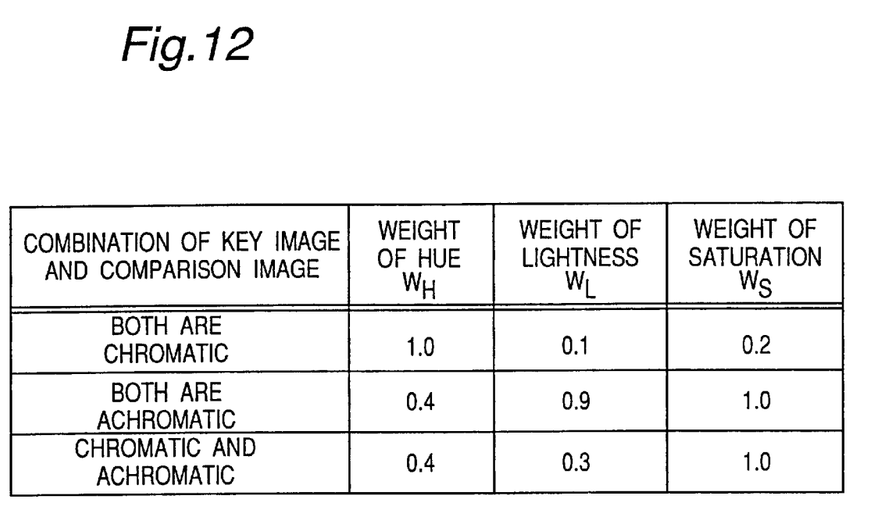
FIG. 12 is a table showing an example of set values of weighting to a hue, a lightness and a saturation used when a degree of similarity is calculated.

FIG. 12 is an example of set values of the weights $W_H$, $W_L$ and $W_S$. The weights are set in step S402 of the above-described comparison and search process. As shown in FIG. 12, set values of weights are classified depending on whether the key image and comparison image are chromatic or achromatic, because the hue difference does not matter so much and influences little to the similarity in the case where the lightness and saturation are low. Concretely, the hue is weighted when both images belong to chromatic color groups, whereas the lightness and saturation are weighted when both images belong to achromatic color groups. If the images are separated to the chromatic and achromatic color groups, the saturation is weighted. In the manner as above, the hue, saturation and lightness are weighted according to the colors to be compared at the calculation of the degree of similarity. Accordingly, the degree of similarity is obtained more closely to the human sense of sight.

Among the degrees of similarity $D_i$ between one color feature $K_i$ of the key image K and all color features $C_j$ (j=1, 2, ... m) of the comparison image C, the degree of similarity with the largest absolute value is selected and set as a degree of similarity $D_i'$ of the color feature $K_i$. Degrees of similarity $D_i'$ for all color features $K_i$ (i=1, 2, ... n) of the key image K are obtained in the same manner. The degree of similarity $D_i'$ and the occupancy ratio $R_{ki}$ are multiplied for each color feature $K_i$ and a sum of the multiplied values are set as a degree of similarity D between the key image K and comparison image C. The degree of similarity D between the key image K and the comparison image C is consequently expressed by an equation (9) hereinbelow.

$$\text{Degree of similarity } D = D_1' \times R_{k1} + D_2' \times R_{k2} + \ldots + D_n' \times R_{kn} \quad (9)$$

According to the present system, in order to extract color features of images, colors are divided to a plural of predetermined color groups, the average color is obtained for every group and the occupancy ratio of the average color to the whole image is detected. Therefore, the extracted color features represent features related to the color of the image more correctly. An image comparison can be executed with higher accuracy based on the thus-extracted color features.

Although the average color of the color group is used as one element of the color features in the above embodiment, the color feature is not limited to the average color. A color representing the color group and defined for every color group (referred to as a "representative color" hereinbelow) can be used. For instance, a color of the pixel appearing most frequently in the color group may be utilized as the representative color of the color group. Alternatively a color naming the color group may be adopted in place of the average color.

According to the image data processing apparatus of the present invention, a plurality of images are compared based on feature information extracted from the images.

The feature information is the representative color in each color group and the occupancy ratio of pixels of image data belonging to each color group to the whole pixels.

Since the similarity of images is judged with the use of the above feature information, similar images can be searched for more correctly.

Moreover, since the degree of similarity of images is calculated with a weight based on the occupancy ratio taken into consideration, the images are compared more closely to the human sense of sight.

In the image processing apparatus of the present invention, the second feature information, i.e., information related to the hue of images is weighted based on the first feature information, namely, information related to the lightness and saturation of images, thereby enabling an image comparison more close to the human sense of sight.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processing apparatus for processing data of images each having of a plurality of pixels, the image data processing apparatus comprising:

an extraction controller for extracting feature information from the images by grouping each pixel constituting the image into a predetermined plurality of color groups based on color elements of each pixel and counting said grouped number of pixels belonging to each color group; and a comparison controller for comparing the image and a plurality of images based on the feature information extracted by said extraction controller;

wherein said feature information comprises a representative color in each color group and an occupancy ratio of a count of pixels belonging to each color group to a total count of pixels in the image; and wherein said representative color is a color expressed by a value obtained by dividing a sum of values of pixels belonging to color groups by the total count of pixels.

2. An image data processing apparatus for processing data of images each having of a plurality of pixels, the image data processing apparatus comprising:

an extraction controller for extracting feature information from the images by grouping each pixel constituting the image into a predetermined plurality of color groups based on color elements of each pixel and counting said grouped number of pixels belonging to each color group; and a comparison controller for comparing the image and a plurality of images based on the feature information extracted by said extraction controller, wherein said comparison controller includes a calculation controller which calculates a degree of similarity among a plurality of images based on said feature information.

3. The image data processing apparatus according to claim 2, wherein said feature information comprises a representative color in each color group and an occupancy ratio of a count of pixels belonging to each color group to a total count of pixels in the image.

4. The image data processing apparatus according to claim 3, wherein said calculation controller calculates said degree of similarity by weighting the representative color.

5. An image data processing apparatus for processing data of images each having of a plurality of pixels, the image data processing apparatus comprising:

an extraction controller for extracting feature information from the images by grouping each pixel constituting the image into a predetermined plurality of color groups based on color elements of each pixel and counting said grouped number of pixels belonging to each color group; and a comparison controller for comparing the image and a plurality of images based on the feature information extracted by said extraction controller, wherein said color elements comprise a hue, a saturation and a lightness.

6. An image data processing apparatus for processing data of images each having a plurality of pixels, the image data processing apparatus comprising:

an input controller for inputting image data of a plurality of images;

an extraction controller for extracting the feature information of images by sorting colors of the image to a plurality of color groups based on predetermined color elements and counting pixels belonging to each color group for every image inputted by said input controller;

an image database for storing image data inputted by the input controller, the image data being linked to the feature information extracted by said extraction controller;

a designating device for designating a key image as a search key; and a search controller for searching an image data having a feature information similar to the feature information of said key image designated by said designating device from said image database, by comparing feature information of said key image with feature information of the image stored in said image database.

7. The image data processing apparatus according to claim 6, wherein said feature information has a representative color in each color group and an occupancy ratio of a count of pixels belonging to each color group to a total count of pixels in the image.

8. The image data processing apparatus according to claim 7, wherein said representative color is a color expressed by a value obtained by dividing a sum of values of pixels belonging to color groups by the total count of pixels.

9. The image data processing apparatus according to claim 6, wherein said comparison controller comprises a calculation controller which calculates a degree of similarity of a plurality of images based on said feature information.

10. The image data processing apparatus according to claim 9, wherein said feature information has a representative color in each color group and an occupancy ratio of a count of pixels belonging to each color group to a total count of pixels in the image.

11. The image data processing apparatus according to claim 10, wherein said calculation controller calculates said degree of similarity by weighting the representative color.

12. The image data processing apparatus according to claim 6, wherein said color elements comprise a hue, a saturation and a lightness.

13. A computer program product in a memory for processing data of images each having a plurality of pixels, the computer program product comprising:

an extraction control for extracting feature information from the images by grouping each pixel of the image into a predetermined plurality of color groups based on color elements of each pixel and counting said grouped number of pixels belonging to each color group; and a comparison control for comparing the image and a plurality of images based on the feature information extracted by said extraction control, wherein said comparison control includes a calculation control for calculating a degree of similarity of a plurality of images based on said feature information.

14. The computer program product according to claim 13, wherein said feature information has a representative color in each color group and an occupancy ratio of a count of pixels belonging to each color group to a total count of pixels consisting of the image.

15. The computer program product according to claim 14, wherein said representative color is a color expressed by a value obtained by dividing a sum of values of pixels belonging to color groups by the total count of pixels.

16. The computer program product according to claim 13, wherein said feature information has a representative color in each color group and an occupancy ratio of a count of pixels belonging to each color group to a total count of pixels in the image.

17. The computer program product according to claim 16, wherein said calculation control calculates the degree of similarity by weighting the representative color.

18. The computer program product according to claim 13, wherein said color elements comprise a hue, a saturation and a lightness.

19. The computer program product according to claim 13, further comprising;

a registration control for registering the image data and the feature in formation extracted by said extraction control into an image database such that the image data is linked to the feature information and a search control for searching the image data from the image database with the use of comparison result obtained in said comparison control.

20. An image processing apparatus for comparing two images based on feature information of the images, the image processing apparatus comprising;

a weighting means for weighting a second feature information of images based on a first feature information of the images, and a comparing means for comparing the two images by using the weighted second feature information of said two images.

21. The image processing apparatus according to claim 20, wherein said first feature information is an information related to a lightness or a saturation of the images, and said second feature information is an information related to a hue of the images.

* * * * *